United States Patent
Finn et al.

(10) Patent No.: US 7,710,903 B2
(45) Date of Patent: May 4, 2010

(54) SYSTEM AND METHOD FOR FLOATING PORT CONFIGURATION

(75) Inventors: Norman W. Finn, Livermore, CA (US); Jacob Jensen, Mountain View, CA (US); John M. Schnizlein, Fort Washington, MD (US)

(73) Assignee: Cisco Technology, Inc., San Jose, CA (US)

( * ) Notice: Subject to any disclaimer, the term of this patent is extended or adjusted under 35 U.S.C. 154(b) by 810 days.

(21) Appl. No.: 11/230,395

(22) Filed: Sep. 20, 2005

(65) Prior Publication Data

US 2007/0064624 A1   Mar. 22, 2007

(51) Int. Cl.
*H04L 12/28* (2006.01)
(52) U.S. Cl. .......................... 370/255; 710/8
(58) Field of Classification Search ................. 370/254, 370/351; 710/8
See application file for complete search history.

(56) References Cited

U.S. PATENT DOCUMENTS

| | | | |
|---|---|---|---|
| 5,060,140 A * | 10/1991 | Brown et al. ................ | 710/105 |
| 5,935,249 A * | 8/1999 | Stern et al. .................... | 726/21 |
| 6,088,754 A | 7/2000 | Chapman | |
| 6,553,489 B1 | 4/2003 | Osler et al. | |
| 7,380,025 B1 * | 5/2008 | Riggins et al. ................ | 710/8 |

OTHER PUBLICATIONS

U.S. Appl. No. 11/230,878, filed Sep. 20, 2005, Engel et al.
U.S. Appl. No. 11/230,774, filed Sep. 20, 2005, Engel et al.
Understanding and Configuring CDP; Software Configuration Guide—Release 12.1 (11b) EW, Cisco Systems, Inc., Jun. 2003, pp. 18-1 through 18-4.
Rigney, C., et al., RFC 2869, entitled Radius Extensions, Jun. 2000, pp. 1-44.
Rigney, C., et al., RFC 2138, entitled Remote Authentication Dial in User Service (RADIUS), Apr. 1997, pp. 1-61.
U.S. Appl. No. 10/896,410, entitled System and Method for Automatically Configuring Switch Ports With Appropriate Features, by Spain et al., on Jul. 21, 2004.
Using Smartport Macros: A Guide to Creating and Applying Cisco IOS Command Macros, Cisco Systems, Inc., 2004, pp. 1-15.

* cited by examiner

*Primary Examiner*—Seema S Rao
*Assistant Examiner*—Wanda Z Russell
(74) *Attorney, Agent, or Firm*—Cesari and McKenna, LLP

(57) ABSTRACT

A system and method automatically configures the interfaces of an intermediate network device. A discovery process operating at the device detects the identity or type of network entities actually coupled to the device's interfaces. Utilizing the identity or type of detected entities, a look-up is performed to obtain a configuration macro specially defined for each detected network entity. The retrieved configuration macros are executed and applied at the respective interfaces. During operation, the intermediate network device continues to monitor the identity and type of entities actually coupled to its interfaces. If a change is detected, such as an entity moving from a first to a second interface, the specially defined configuration macro for that entity floats from the first to the second interface where it is executed and applied.

28 Claims, 6 Drawing Sheets

CONFIGURATION TABLE 214

| NEIGHBORING ENTITY IDENTITY (502) | CONFIGURATION INFORMATION SET NAME (504) | MEMORY POINTER (506) |
|---|---|---|
| DESKTOP PC | CISCO-DESKTOP | 429673 |
| COMBINATION DESKTOP PC AND VoIP PHONE | CISCO-DESKTOP-PHONE | 551233 |
| VoIP PHONE | CISCO-PHONE | 844112 |
| SHARED MEDIUM | CISCO-SHARED | 313266 |
| SERVER | CISCO-SERVER | 445111 |
| ACCESS SWITCH | CISCO-SWITCH-ACCESS | 652354 |
| DISTRIBUTION SWITCH | CISCO-SWITCH-DISTRIBUTION | 127453 |
| ROUTER | CISCO-ROUTER | 228463 |
| INTERNET | CISCO-INTERNET | 343122 |
| UN-USED | CISCO-OPEN | 299471 |

SYSTEM AND METHOD FOR FLOATING PORT CONFIGURATION

BACKGROUND OF THE INVENTION

1. Field of the Invention

The present invention relates to computer networks and, more specifically, to configuring devices utilized in computer networks.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, that defines the functions performed by data link and physical layers of a communications architecture (i.e., a protocol stack).

One or more intermediate network devices are often used to couple LANs together and allow the corresponding entities to exchange information. For example, a bridge may be used to provide a "bridging" or "switching" function between two or more LANs or end stations. Typically, the bridge is a computer and includes a plurality of ports that may be coupled to end stations, other bridges, routers or other network entities. The bridge includes one or more line cards and/or network interface cards (NICs) that establish ports for the exchange of network messages. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Switches may also be classified depending on the role they play within the computer network. An access switch, for example, refers to an intermediate network device to which end stations, e.g., workstations, servers, etc., are directly coupled, and which is typically located at an edge of a computer network. A distribution switch refers to an intermediate network device to which one or more access switches are directly coupled. Distribution switches are often deployed in a central portion of the network.

Typically, the ports of a switch are physically connected, e.g., by cables, to the end stations, switches, routers, etc. After the ports of the switch have been connected as desired, a network administrator configures the switch in order to set operating conditions and to specify the protocols and applications that are to run on the interfaces corresponding to the switch ports. An interface refers to the boundary between protocol layers of a communication stack, such as the boundary between the physical and data link layers or between the data link and Internet Protocol (IP) layers. Thus, each port of a switch has one or more interfaces associated with it, and the terms interface and port are used interchangeably throughout this document. To configure the interfaces of a bridge, the network administrator enters a series of commands at the Command Line Interface (CLI) of a management console, and conveys those commands to the bridge. Each of the bridge's interfaces has a corresponding name or identity, such as a number. Typically, the interface number is assigned by the factory when the respective line card or NIC is installed into the switch. A command, such as "show interfaces", when entered at the management console will return a report listing all of the interfaces on the bridge and their corresponding numbers. Examples of interface identifiers include "Serial 0", "Ethernet 2", etc.

To begin configuring a given interface, the network administrator enters a command at the CLI specifying the given interface, such as "interface ethernet 2". The network administrator then enters a series of commands. For example, to set the size of a transmit queue at the interface, the network administrator may enter the command "tx-queue-limit number". To adjust the maximum packet size, the network administrator may enter the command "mtu bytes". After entering all of the desired configuration commands, the network administrator exits the configuration process. The configuration commands are then collected, executed and applied to the specified interface. The configuration is thereafter fixed to that interface, i.e., to "interface ethernet 2". Once an interface has been configured, the network administrator can review the command sequence by entering a "show" type command.

Network administrators typically configure the interfaces of a bridge differently depending on what device is to be connected to the interface. For example, suppose interface "Ethernet 2" is connected to a combination desktop PC/Voice over Internet Protocol (VoIP) phone, while interface "FastEthernet 7" is connected to a backbone router. The network administrator may configure an Access Control List (ACL) on the "Fast Ethernet 7" interface that blocks certain types of un-wanted traffic from being sent and/or received on that interface. The network administrator may also configure each interface with one or more Port Virtual Local Area Network IDs. If the device is a router, the network administrator configures each interface with one or more IP addresses.

The process of configuring interfaces, as described above, is time-consuming for network administrators. It is also error prone, especially when changes are made to the network. Suppose, for example, that a combined desktop PC/VoIP phone, which had been connected to interface "Ethernet 2", is moved to a new port corresponding to interface "Ethernet 15", and that a distribution switch is connected to the port corresponding to interface "Ethernet 2". In this case, the network administrator must go in and configure the "Ethernet 15" interface. He or she must also change the configuration of interface "Ethernet 2". This often requires that the network administrator be logged into the switch, e.g., by a laptop computer, or be in voice contact with someone at the management console, e.g., by phone, as the physical cabling is being changed.

As more and more changes are made the network, it is possible that interfaces may become mis-configured, since the device actually coupled to a given interface may be very different from the one for which the interface was originally configured. Such errors, moreover, can be difficult to discover. These types of mis-configurations may result in reduced performance of the computer network. They may also result in improper access being granted to different parts of the network, thereby compromising the network's security. Accordingly, a need exists to simplify the process of configuring interfaces, and to reduce the errors that can result from changes or modifications to the network.

SUMMARY OF THE INVENTION

Briefly, the invention relates to a system and method for automatically configuring the ports or interfaces of an intermediate network device. Instead of fixing particular configuration information to a given interface, configuration information, which has been specially defined for certain entities, is permitted to "float" within the intermediate network device. A discovery process is run that identifies the neighboring network entities to which the intermediate device is connected. Various ones of the "floating" configuration information sets are then selected for application to the device's interfaces, based on the identifier or type corresponding to the entity that was determined to actually be coupled to the given interface. That is, each set of configuration information that "floats" within the device is associated with one or more network entity identifiers or types.

Once the discovery process determines which particular network entity is actually accessible through a given interface, then the configuration information that was specially defined for that entity is applied to the given interface. If changes are made to the computer network such that a network entity, which was originally accessible through a first interface, is moved over to a second interface, e.g., the cabling is changed, then this change is quickly detected by the discovery process. In response, the configuration information specially defined for that entity automatically "floats" from the first interface over to the second interface, where it is executed and applied. In other words, configuration information is effectively bound to actual network entities rather than to the device's interfaces. In the preferred embodiment, a clean-up process is run on the first interface to restore its configuration to a default setting.

BRIEF DESCRIPTION OF THE DRAWINGS

The invention description below refers to the accompanying drawings, of which:

FIG. 5 is a highly schematic illustration of a preferred data structure in accordance with the present invention.

DETAILED DESCRIPTION OF AN ILLUSTRATIVE EMBODIMENT

Figure 1:
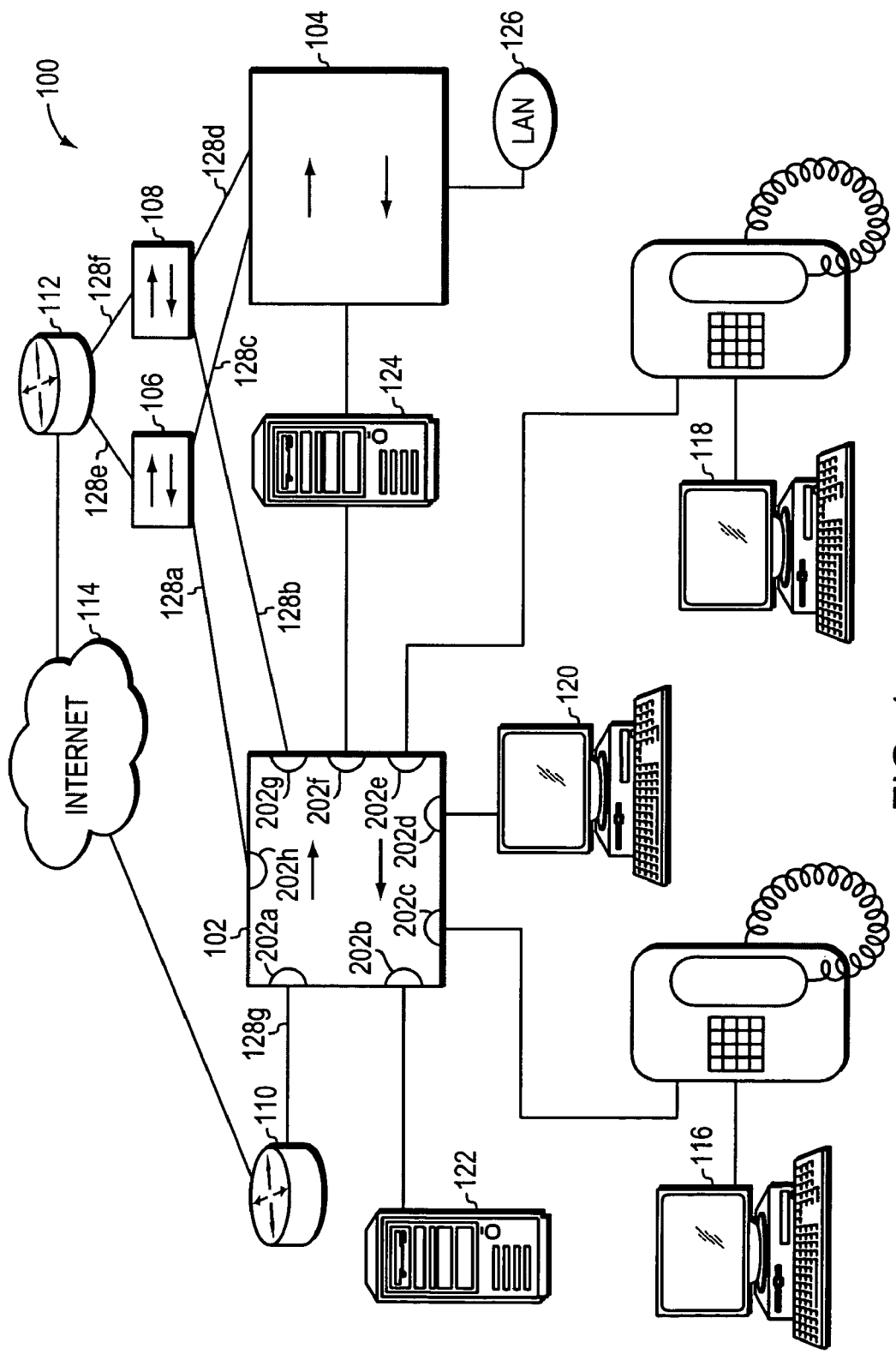
FIG. 1 is a highly schematic illustration of a computer network.

FIG. 1 is a highly schematic illustration of a computer network 100. The computer network 100 includes a plurality of network entities, such as end stations, local area networks (LANs), and intermediate network devices. The intermediate network devices allow the end stations and LANs to communicate with each other. The computer network 100 includes two access switches 102 and 104, two distribution switches 106 and 108, and two routers 110 and 112. Routers 110 and 112 are connected, and thus provide access, to the Internet 114. Coupled to access switches 102 and 104 are LANs and end stations. More specifically, coupled to access switch 102 are two combination desktop personal computers (PCs) and Voice over Internet Protocol (VoIP) phones 116 and 118, a desktop PC 120, and two servers 122 and 124. Server 124 is also coupled to access switch 104 as is LAN 126. The two access switches 102 and 104 are coupled to the two distribution switches 106 and 108 by a plurality of links or trunks 128a-d, which may be point-to-point links. The two distribution switches 106 and 108, in turn, are coupled to router 112 by links 128e and 128f. Access switch 102 is additionally coupled to router 110 by link 128g.

Each switch 102, 104, 106 and 108 includes a plurality of ports 202 such that each end station, LAN or other intermediate network device is coupled to at least one switch port. Each switch 102, 104, 106 and 108, moreover, preferably identifies its own ports, e.g., by port numbers, such as zero, one, two, three, etc. The switches are thus able to associate specific ports with the end stations, LANs and/or other intermediate network devices coupled thereto.

In the illustrative embodiment, server 124 is preferably configured as an authentication, authorization and accounting (AAA) services server. Entities of computer network 100 may communicate with the AAA server 124 through the Remote Authentication Dial-In Service (RADIUS). The RADIUS service is described at Request for Comments (RFC) 2138, dated June 2000, and at RADIUS Support for Extensible Authentication Protocol (EAP), RFC 2869, dated September 2003, both of which are hereby incorporated by reference in their entireties.

It should be understood that the network 100 of FIG. 1 is meant for illustrative purposes only and that the present invention will operate with other networks having possibly far more complex topologies.

Figure 2:
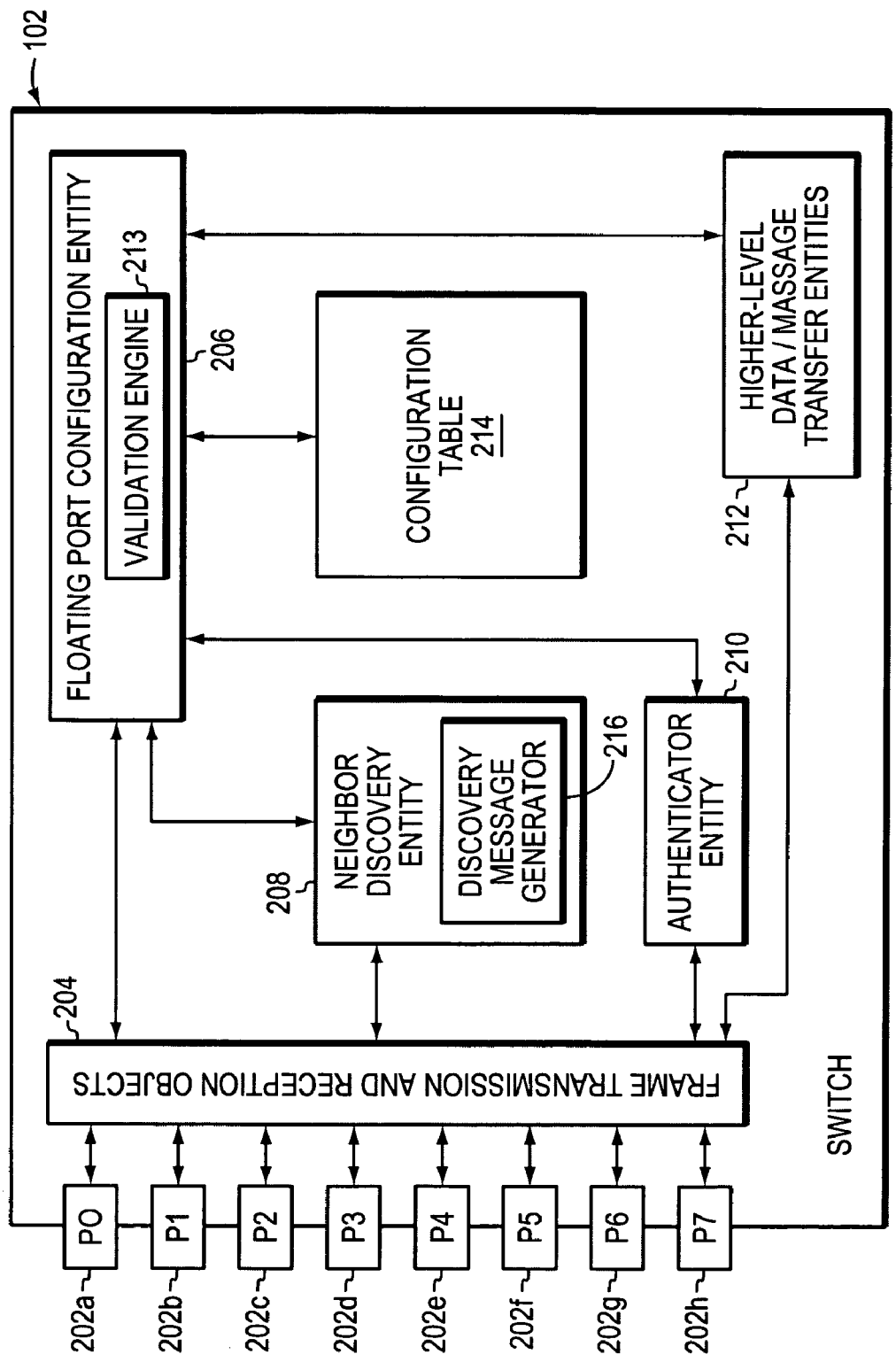
FIGS. 2 and 3 are partial block diagrams of an intermediate network device in accordance with the present invention.

FIG. 2 is a partial, functional block diagram of an intermediate network device, such as access switch 102. As mentioned above, access switch 102 includes a plurality of ports 202a-202h each of which is preferably identified by a number (e.g., P0-P7). One or more frame transmission and reception objects, designated generally at 204, are associated with the ports 202a-h such that network messages, including frames, received at a given port, e.g., P3, may be captured, and frames to be transmitted by switch 102 may be delivered to the appropriate port, e.g., P1, for transmission. Frame reception and transmission objects 204 may include message storage structures, such as priority queues.

In accordance with a preferred embodiment of the invention, switch 102 is provided with a plurality of protocol or execution entities. In particular, switch 102 includes a floating port configuration entity 206, a neighbor discovery entity 208, an authenticator entity 210, and one or more higher-level data/message transfer entities designated generally at 212. The floating port configuration entity 206 preferably includes a validation engine 213, and is in communication with, or otherwise has access to, a configuration table 214. In addition, the neighbor discovery entity 208 preferably includes a discovery message generator 216 for generating messages to be transmitted from one or more of the ports 202a-h.

Figure 3:
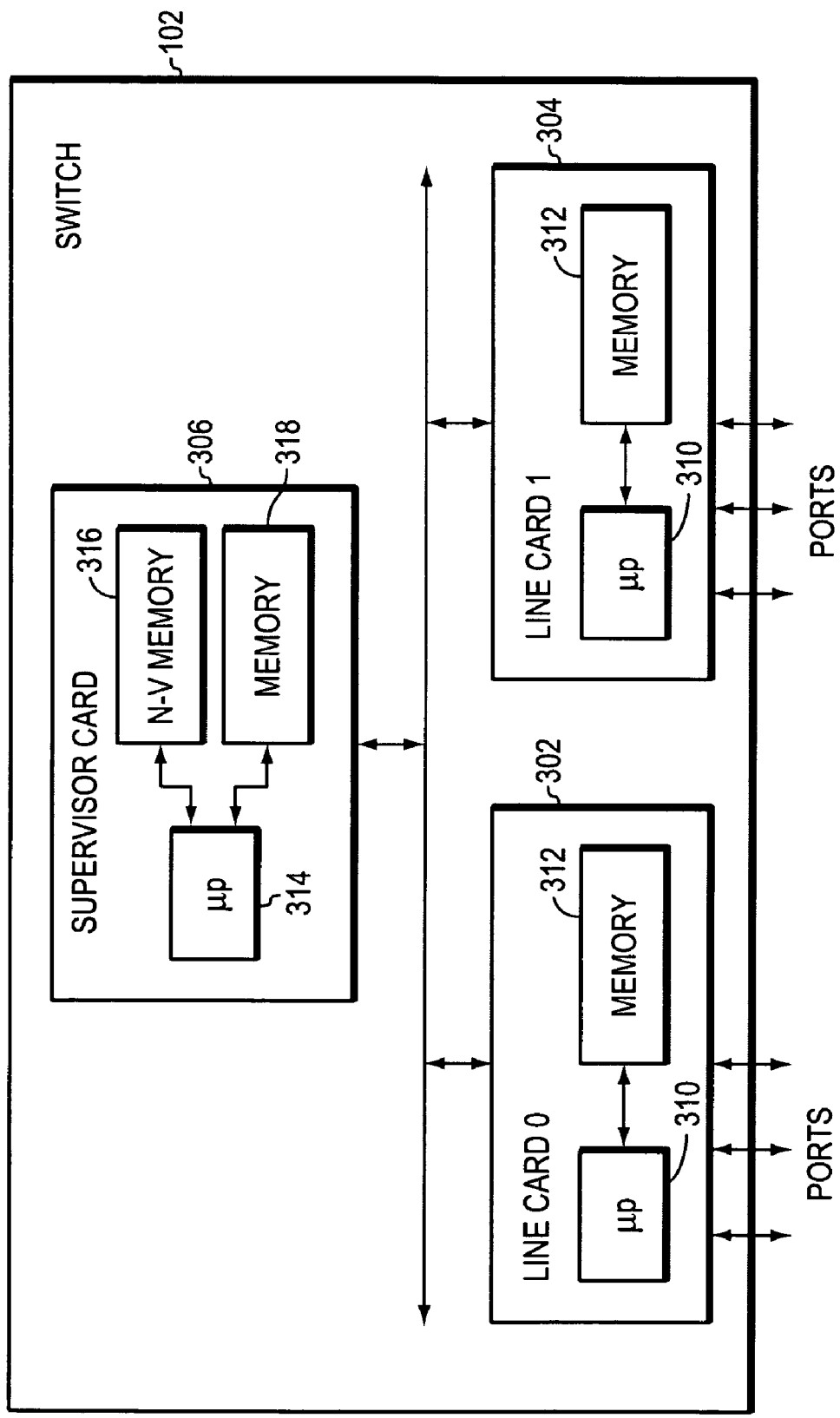

In the illustrated embodiment, switch 102 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 3 is another highly schematic, partial block diagram of switch 102 illustrating such components. As shown in FIG. 3, switch 102 includes a plurality of line cards 302 and 304, and a supervisor card 306. Cards 302, 304 and 306 are in communicating relationship with each other through a communication bus 308. Each of the line cards 302 and 304 includes a microprocessor (µP) 310 and at least one memory 312. The supervisor card 306 also includes a μP 314, as well as both a non-volatile (N-V) memory 316 and a volatile memory 318, e.g., RAM.

Referring again to FIG. 2, it will be understood by those skilled in the art that entities 206, 208, 210 and 212 may each comprise registers and combinational logic configured and arranged to produce sequential logic circuits. In the illustrated embodiment, entities 206, 208, 210 and 212 are preferably software modules or libraries containing program instructions pertaining to the methods described herein and executable by one or more processing elements, such as the microprocessors 310 and/or 314 (FIG. 3), of switch 102. Other computer readable media may also be used to store and execute these program instructions. Nonetheless, those skilled in the art will recognize that various combinations of software and hardware, including firmware, may be utilized to implement the present invention. Similarly, configuration table 214 may be stored at any one or more of memories 312, 316 and/or 318.

Suitable intermediate network device platforms for use with the present invention include, but are not limited to, the commercially available Catalyst 4000 switches and 7200 series routers from Cisco Systems, Inc. of San Jose, Calif.

In operation, switch 102 preferably determines the identity of each network entity that is actually "behind", i.e., reachable through, each of its ports 202. The term identity is used broadly to mean identity, name, or type or device. Using this information, switch 102 then performs a look-up on its configuration table 214 to retrieve the configuration information specially defined for the network entities that have been detected. These specially defined configuration information is then executed and applied at the corresponding ports. Once a port has been correctly configured for the network entity to which it is actually connected, the switch 102 allows network messages, e.g., data frames, to be sent to and received from the port.

In a preferred embodiment, the configuration information sets are in the form of files or macros. Those skilled in the relevant art, however, will understand that the configuration information sets may take other forms besides files or macros, and the term configuration information set is intended broadly.

Figure 4A:
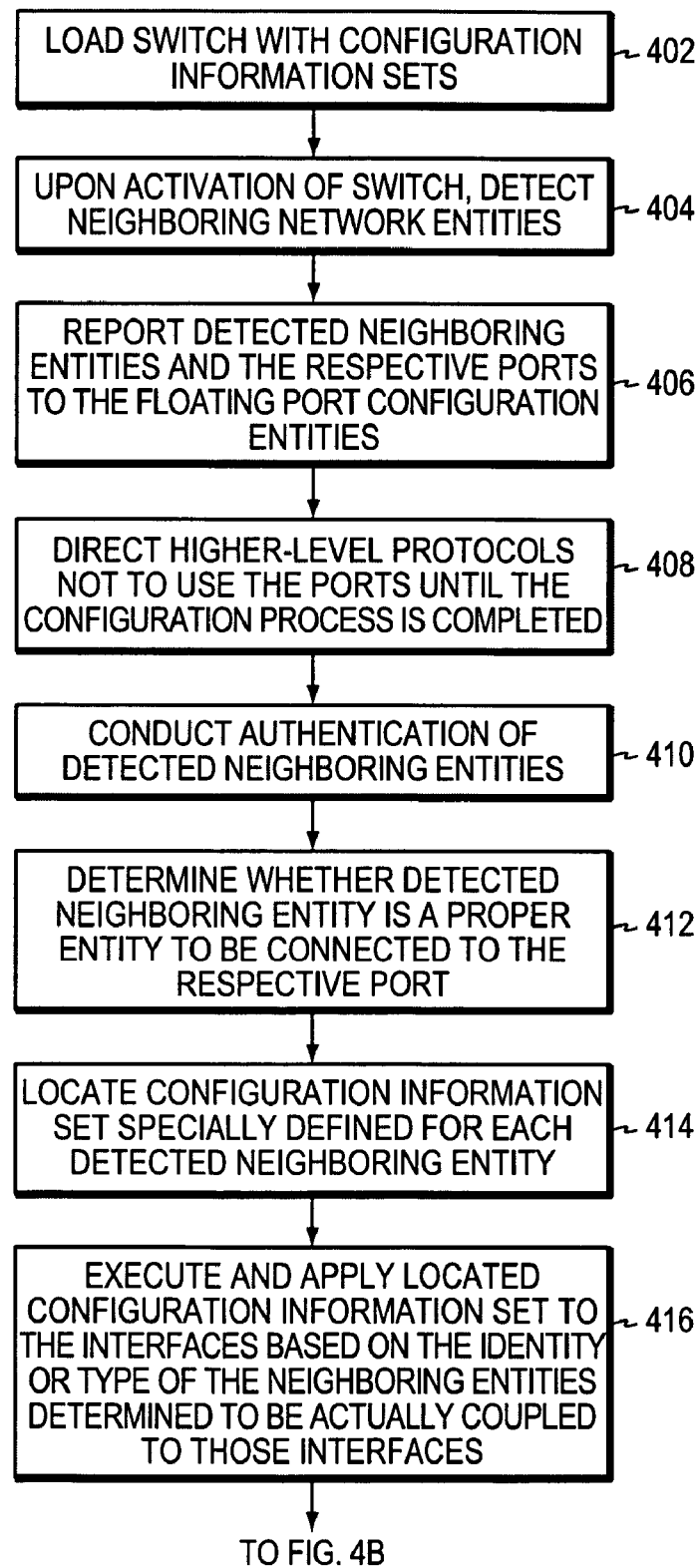
FIG. 4 is a flow diagram of a preferred method of the present invention.
Figure 4B:
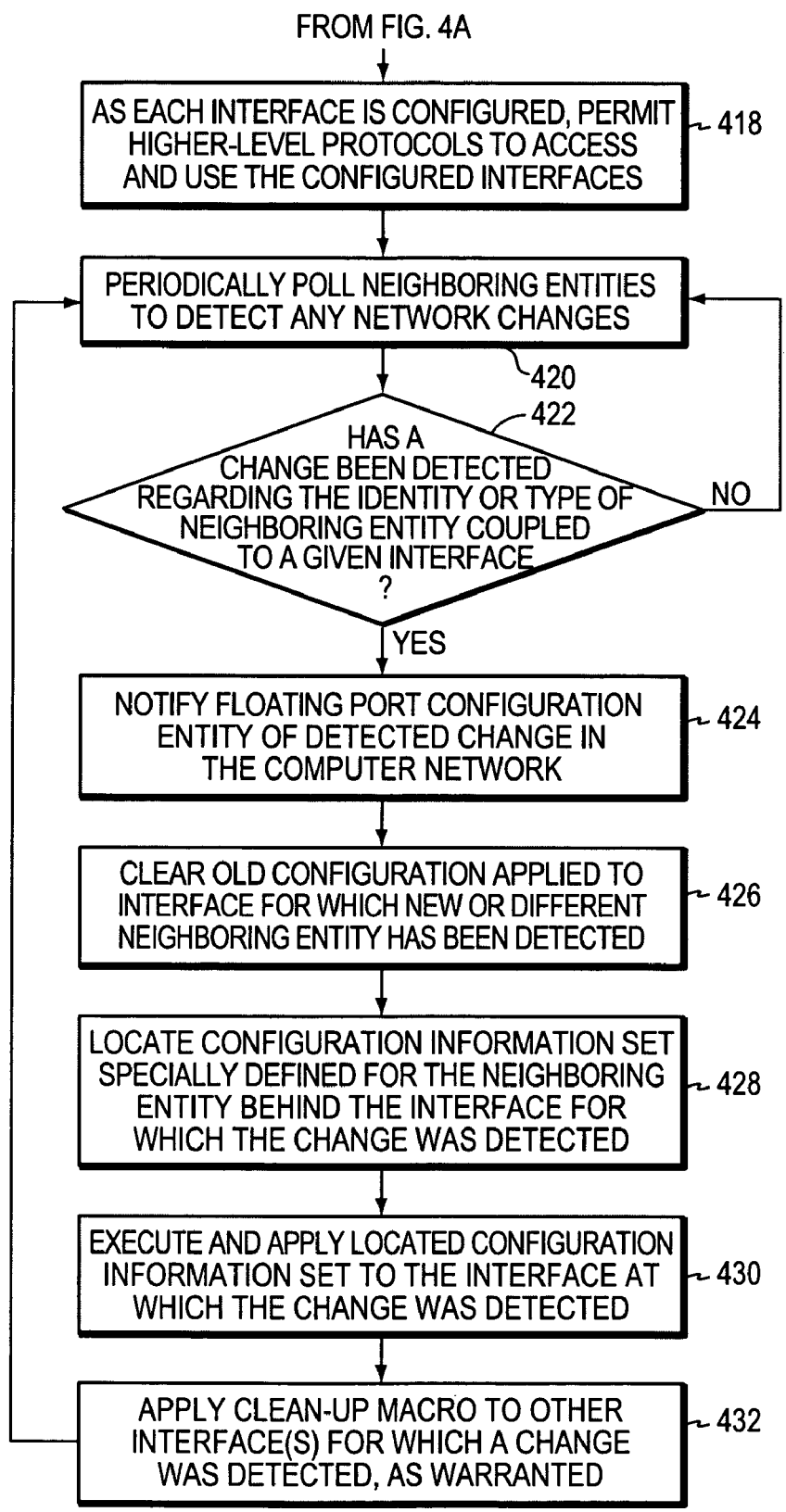

FIGS. 4A-B are a flow diagram of a preferred method of the present invention.

Prior to the switch 102 being activated, the configuration table 214 is preferably loaded with a plurality of specially defined configuration information sets, such as files or macros, as indicated at block 402 (FIG. 4A). Preferably, a network administrator uploads a plurality of configuration information sets into table 214 by utilizing a network management console. Each configuration information set is a particular set of Command Line Interface (CLI) commands specially defined, i.e., chosen, for use with a particular network entity or type of entity, such as a router, a desktop PC, etc. The configuration information sets may be created by the network administrator or they may be obtained from a vendor, such as Cisco Systems Inc.

A suitable method for creating configuration information sets, and then using them to configure the ports and/or interfaces of an intermediate network device is described in commonly owned, co-pending patent application Ser. No. 10/896,410, filed Jul. 21, 2004, entitled "System and Method for Automatically Configuring Switch Ports with Appropriate Features" and in "Using Smartport Macros: A Guide to Creating and Applying Cisco IOS Command Macros", copr. 2004, both of which are hereby incorporated by reference in their entireties.

FIG. 5 is a highly schematic illustration of a preferred format of the configuration table 214. As shown, the configuration table 214 is preferably organized, at least logically, as a table or array having a plurality of columns and rows whose intersections define cells or records for storing information. Configuration table 214 preferably has a Neighboring Entity Identity or Type column 502, a Configuration Information Set Name column 504, and a Memory Pointer column 506. Table 214 also has a plurality of rows 508*a-j*. The identities of network entities that might possibly be coupled to switch 102, and for which a configuration information set has been created, are loaded into the cells of column 502. The names of the corresponding configuration information sets are loaded into the respective cells of column 504. Pointers to memory locations where the corresponding configuration information sets are stored are preferably loaded into the respective cells of column 506.

Those skilled in the art will recognize that table 214 may take other forms, including having more or less information. Those skilled in the art will further recognize that other mechanisms besides a table may be used to hold configuration information sets.

Once configuration table 214 has been loaded with information, switch 102 may be activated. Upon activation, the neighbor discovery entity 208 proceeds to determine the name and/or type of entity to which each port 202 is coupled, as indicated at block 404. Specifically, the discovery message generator 216 preferably formulates one or more inquiry messages for transmission from each port 202*a-h*. The entities of computer network 100 are preferably configured to respond to such inquiry messages with response messages that contain the identity of the entity that is responding, e.g., "Distribution-Switch07". These response messages are received at switch 102, and passed to the neighbor discovery entity 208 for evaluation. Once entity 208 has determined the identity of the entity that is actually located "behind" a given port 202, it passes this information e.g., port number and identity of the network entity, to the floating port configuration entity 206, as indicated at block 406.

The neighbor discovery entity 208 may be configured to utilize one or more well-known network discovery protocols to detect neighboring entities. A suitable network discovery protocol includes the Cisco Discovery Protocol (CDP) from Cisco Systems, Inc., as described in *Understanding and Configuring CDP* (Jun. 30, 2003), which is hereby incorporated by reference in its entirety. Other suitable discovery protocols include the Institute of Electrical and Electronics Engineers (IEEE) Std. 802.1AB-2005, Station and Media Access Control Connectivity Discovery, and the IEEE Std. 802.1X-2004, Port Based Network Access Control, both of which are also hereby incorporated by reference in their entireties. The discovery message generator 216 preferably formulates inquiry messages in accordance with the particular discovery protocol being executed by the neighbor discovery entity 208. These inquiry messages are sent from each port 202*a-h*. Accordingly, such inquiry messages, as sent by switch 102, are received by router 110, distribution switch 106, distribution switch 108, AAA server 124, desktop PC/VoIP phone 118, desktop PC 120, desktop PC/VoIP phone 116 and server 122. Each such entity, in turn, preferably responds to switch 102 with a discovery response message identifying itself. A suitable identifier includes the "system name" defined in the CDP protocol.

Preferably, the floating port configuration entity 206 directs the higher-level data/message transfer entities 212 to delay transmitting any messages from, or otherwise using, the ports 202 until after the configuration process is completed, as indicated at block 408. Nevertheless, in the preferred embodiment, entity 206 allows lower-level protocols, such as the Distributed Diagnostics and Service Network (DDSN) Transfer Process (DTP) and/or the Uni-Directional Link Detection (UDLD) protocols, to be run on the ports 202 during the configuration process. It should be understood, moreover, that the neighbor discovery entity 208 may ignore ports that have been disabled.

In addition to the discovery process, switch 102 may also be configured to authenticate the entities to which it is connected, as indicated at block 410. More specifically, as provided in IEEE Std. 802.1X, each neighboring network entity, operating as a "supplicant" in 802.1X terminology, issues an ASSOCIATE request message to switch 102, which operates as the "authenticator" in 802.1X terminology. The ASSOCIATE request message is passed on to the authenticator entity 210, which may temporarily designate the port on which it was received as "unauthorized", thereby blocking all traffic on the port except for 802.1X traffic. The authenticator entity 210 then returns an ASSOCIATE response message to the network entity, which in turn responds with a START message. This time, the authenticator entity 210 responds with a REQUEST IDENTITY message to the network entity, and the network entity responds by supplying its identity in a RESPONSE message. The authenticator entity 210 then forwards the received identity to the authentication server 124, which proceeds to authenticate the network entity using a selected authentication algorithm.

If the authentication server 124 verifies the network entity's credentials, it sends an ACCEPT message to the authenticator entity 210 at switch 102. The authenticator entity 210 responds by sending a SUCCESS message to the network entity, and by changing the port from the unauthorized condition to an authorized condition. If the network entity's credentials cannot be verified, then the authentication server 124 returns a FAILURE message to the authenticator entity 210, and the port is left in the unauthorized condition.

In an alternative embodiment, the authentication server 124 is further configured to return a configuration information set name to switch 102, assuming the network entity's credentials are verified. In this embodiment, the configuration table 214 is disposed at the authentication server 124. The authentication server 124 performs the look-up to identify the proper configuration information set for the entity seeking authentication.

In addition to the name, the authenticator server 124 may also return one or more parameter values. That is, configuration information sets can be created in which one or more commands include parameters or keywords, such as "$VLANID", rather than actual values. To execute and apply such a configuration information set, a value, such as "$VLAN10", must be provided for each parameter or keyword. Appropriate values may be stored at the AAA server 124, and passed to switch 102 along with the configuration information set name for use with a particular network entity.

Upon learning that a particular network entity is actually associated with a respective port 202, the validation engine 213 of the floating port configuration entity 206 preferably determines whether the network entity is a proper entity to be coupled to that port, as indicated at block 412. Specifically, the validation engine 213 may be pre-configured with information specifying the types of entities that may (or may not) be coupled to different ones of the ports 202 of switch 102. For example, knowing that certain configuration information sets include particular CLI commands, it may be determined by the network administrator that such commands are not appropriate for certain kinds of ports or interfaces. If so, the validation engine 213 is loaded with information indicating that a given type of network entity is not to be connected to that port. The validation engine 213 may similarly detect an error if a port intended to provide a high-speed, e.g., 1 Gbit/sec, link to another network segment appears to have a much slower speed, e.g., 10 Mbit/sec., thereby suggesting a possible mis-wiring.

Based on the results of the discovery process, entity 206 learns that port P0 is coupled to a router, that ports P1 and P2 are coupled to distribution switches, that ports P3 and P7 are coupled to servers, that ports P4 and P6 are coupled to desktop PC/VoIP phone combinations, and that port P5 is coupled to a desktop PC. Assuming these entities are appropriate for the respective ports, entity 206 proceeds to configure the interfaces. In particular, the floating port configuration entity 203 performs a look-up on the configuration table 214 to identify the appropriate configuration macro specially designed for each type of network entity, as indicated at block 414. For example, upon learning that port P4 is coupled to a combination desktop PC/VoIP phone, entity 206 determines that configuration macro "cisco-desktop-phone" of row 508b should be applied. Entity 206 utilizes the pointer from column 506, i.e., pointer value "551233", to retrieve this configuration macro from memory, and executes and applies it at the interface corresponding to port P4, as indicated at block 416. Similarly, upon learning that port P1 is coupled to a distribution switch, entity 206 determines that configuration macro "cisco-switch-distribution" should be applied. Again, using the pointer from column 506, i.e., pointer value "127453", entity 206 retrieves this macro and executes it at the interface corresponding to port P1.

Those skilled in the art will recognize that the configuration macros may be included within table 214 itself, rather than being stored separately in memory. Regardless of where they are stored, the identified configuration macro is retrieved, executed and applied to the corresponding interface.

This process is preferably repeated for each interface, resulting in the configuration information designed for a particular entity automatically being applied to the port 202 leading to that entity. Thus, configuration information generated for a specific network entity, such as a combination desktop PC/VoIP phone 118, is applied to the port, e.g., P4, that has been determined to actually be coupled to that particular network entity.

Once a given port 202 is configured, the floating port configuration entity 206 preferably notifies the higher-level data/message transfer entities 212 that data messages, e.g., frames, may now be sent from and received at the given port, as indicated at block 418 (FIG. 4B).

Advantageously, the floating port configuration entity 206 is able to respond to network changes quickly and correctly without network administrator involvement. In particular, neighbor discovery entity 208 continues to issue inquire messages from ports 202 periodically during operation of switch 102 in order to confirm that the previously identified entities are still located "behind" each of the ports 202, as indicated at block 420. If the neighbor discovery entity 208 learns that a particular device has moved from one port to another, it preferably notifies the floating port configuration entity 206, as indicated at blocks 422 and 424. Suppose, for example, that distribution switch 106 is disconnected from port P1 of switch 102, and that server 122 is disconnected from port P7 and re-connected at the now vacant port P1. Entity 208 will quickly detect this change and notify the floating port configuration entity 206.

Specifically, the neighbor discovery entity 208 will notify entity 206 that port P1 now leads to server 122 rather than to distribution switch 106, and that no entity is presently connected to port P7. In response, the floating port configuration entity 206 first clears the current configuration information that was applied to port P1, as indicated at block 426. To clear the configuration information applied to port P1, entity 206 may execute a "clean-up" macro at port P1. The clean-up macro preferably removes all of the previous configuration information that was applied to port P1 when it was connected to distribution switch 106. Entity 206 then identifies the appropriate configuration macro to be executed and applied at port P1, now that it is actually connected to server 122, as indicated at block 428. Entity 206 then executes and applies this particular configuration macro at port P1, as indicated at block 430. In addition, now that port P7 is empty, entity 206 preferably applies the "clean-up" macro to this port as well, as indicated at block 432. As shown, the configuration information specially defined for a server "floats" from port P7 to P1 upon discovering that the server has been disconnected from port P7 and reconnected at port P1.

The foregoing description has been directed to specific embodiments of this invention. It will be apparent, however, that other variations and modifications may be made to the described embodiments, with the attainment of some or all of their advantages. For example, upon being authenticated, the neighboring entities may supply their own configuration macros. Therefore, it is an object of the appended claims to cover all such variations and modifications as come within the true spirit and scope of the invention.

What is claimed is:

1. An intermediate network device for use in a computer network having a plurality of network entities, the intermediate network device comprising:
    a plurality of interfaces that are in communicating relationship with respective ones of the network entities;
    one or more protocols for sending and receiving data messages from the plurality of interfaces;
    a discovery entity coupled to the plurality of interfaces that detects an identity of the respective ones of the network entities that are in communicating relationship with corresponding ones of the plurality of interfaces;
    a floating port configuration entity coupled to the discovery entity; and
    a plurality of configuration information sets accessible by the floating port configuration entity for use in configuring the plurality of interfaces, wherein
    the floating port configuration entity retrieves a selected configuration information set for use with a given interface based on the identity of the network entity which was detected as being in communicating relationship with the given interface, and executes and applies the selected configuration information set at the given interface, and
    wherein the one or more protocols delay sending and receiving data messages from the given interface until the selected configuration information set is executed and applied.

2. The intermediate network device of claim 1 wherein the identity of the respective ones of the network entities is a name or a type.

3. The intermediate network device of claim 2 wherein the discovery entity transmits one or more inquiry messages from the plurality of ports and receives, in response to the one or more inquiry messages, one or more response messages sent by the respective ones of the network entities, the one or more response messages containing the identity of the respective ones of the network entities.

4. The intermediate network device of claim 2 wherein, in response to a first network entity moving from a first interface to a second interface, the floating port configuration reconfigures the second interface with the configuration information set corresponding to the first network entity.

5. The intermediate network device of claim 4 wherein the floating port configuration entity executes and applies a default configuration information set to the first interface.

6. The intermediate network device of claim 1 wherein the respective ones of the network entities include one or more of workstations, servers, and other intermediate network devices.

7. The intermediate network device of claim 1 further comprising an authentication entity that determines whether one or more of the respective ones of the network entities are authorized entities of the computer network.

8. The intermediate network device of claim 7 wherein the authentication entity is configured to transition one or more of the intermediate network device's interfaces from an unauthorized to an authorized condition.

9. The intermediate network device of claim 1 further comprising a validation engine that determines whether one or more of the respective ones of the network entities are valid for the corresponding interface to which the respective ones of the network entities are in communication relationship.

10. The intermediate network device of claim 1 wherein at least one configuration information set is one of a macro or a file.

11. The intermediate network device of claim 1 wherein the one or more protocols are higher-level protocols, and wherein at least some lower-level protocols are permitted to send and receive data messages from the given interface prior to the configuration information set being executed and applied to the given interface.

12. The intermediate network device of claim 1 further comprising:
    a clean-up macro configured to clear configuration information that was executed and applied to the given interface.

13. A method for configuring a plurality of interfaces of an intermediate network device, the interfaces being in communicating relationship with corresponding network entities, the method comprising:
    storing one or more configuration information sets at the intermediate network device, the configuration information sets being associated with a network entity identifier;
    running a neighbor detection process that automatically detects an identifier corresponding to one or more network entities in communicating relationship with a given one of the device's interfaces;
    delaying certain data messages from being sent from and from being received on the given interface until a configuration information set is executed and applied to the given interface;
    retrieving automatically a selected configuration information set based on the detected identifier of a first network entity; and
    executing and applying the selected configuration information set to the given interface with which the first network entity is in communicating relationship.

14. The method of claim 13 further comprising:

authenticating the one or more network entities detected as being in communicating relationship with the device's interfaces; and denying access to a network entity that fails authentication.

15. The method of claim 13 wherein the detected identifier is one of a name, an identity and a type.

16. The method of claim 13 further comprising:

detecting that the first network entity, which was in communicating relationship with a first interface, has moved such that the first network entity is in communicating relationship with a second interface; and executing and applying automatically the selected configuration information set at the second interface.

17. The method of claim 13 further comprising:

clearing the configuration executed and applied to the first interface.

18. An intermediate network device for use in a computer network having a plurality of network entities, the intermediate network device comprising:

a plurality of interfaces that are in communicating relationship with respective ones of the network entities;

a plurality of configuration information sets, each configuration information set having one or more configuration commands and being associated with a network entity identifier;

means for detecting an identifier assigned to a first network entity that is in communicating relationship with a first interface;

means for preventing certain data messages from being sent from and from being received on the first interface until a configuration information set is executed and applied to the given interface;

means for selecting a configuration information set based on the detected identifier assigned to the first network entity; and means for executing and applying the selected configuration information set to the first interface.

19. The intermediate network device of claim 18 wherein each configuration information set is a macro.

20. The intermediate network device of claim 18 wherein the certain data are data messages associated with higher-level protocols, and wherein the means for preventing permits at least some lower-level protocols to send and receive data messages from the given interface prior to the configuration information set being executed and applied to the given interface.

21. The intermediate network device of claim 18 further comprising:

means for authenticating the first network entity that is in communicating relationship with the first interface and transitioning the first interface from an unauthorized to an authorized condition.

22. The intermediate network device of claim 18 further comprising:

means for clearing configuration information that was executed and applied to the first interface.

23. A method comprising:

storing one or more configuration information sets at an intermediate network device having a plurality of interfaces;

running a neighbor detection process that automatically detects the identity of a network entity coupled to a given one of the intermediate network device's interfaces;

directing at least some protocols not to send and receive data messages from the given interface until a configuration information set is executed and applied to the given interface;

locating automatically a configuration information set for use with the given interface based on the identity of the network entity coupled to the given interface; and executing and applying the located configuration information set to the given interface.

24. The method of claim 23 wherein the at least some protocols directed not to use the given interface are higher-level protocols and the directing permits at least some lower-level protocols to be run on the given interface prior to the configuration information set being executed and applied to the given interface.

25. The method of claim 23 further comprising:

authenticating the network entity coupled to the given interface; and transitioning the given interface from an unauthorized to an authorized condition.

26. The method of claim 23 further comprising:

detecting that the network entity that was coupled to the given interface has moved such that the network entity is coupled to a second interface of the intermediate network device; and executing and applying automatically the located configuration information set to at the second interface.

27. The method of claim 23 further comprising:

clearing configuration information that was executed and applied to the given interface.

28. The method of claim 23 further comprising:

determining whether or not the network entity coupled to the given interface is of a type approved for the given interface.

* * * * *